(No Model.)

S. A. BAILEY.
VEHICLE SPRING.

No. 271,187. Patented Jan. 23, 1883.

WITNESSES

INVENTOR

UNITED STATES PATENT OFFICE.

SELDEN A. BAILEY, OF NEW YORK, N. Y., ASSIGNOR TO THE LARK MANUFACTURING COMPANY, OF SAME PLACE.

VEHICLE-SPRING.

SPECIFICATION forming part of Letters Patent No. 271,187, dated January 23, 1883.

Application filed August 7, 1882. (No model.)

*To all whom it may concern:*

Be it known that I, SELDEN ARNOLD BAILEY, a citizen of the United States of America, residing at New York, in the county of New York and State of New York, have invented certain new and useful Improvements in Vehicle-Springs, of which the following is a specification, reference being had therein to the accompanying drawings.

This invention relates to springs for side-bar vehicles.

The object of the invention is to provide a spring, simple in construction and symmetrical in appearance, on which the vehicle-body will maintain a steady and easy carriage, whether under light or heavy loads.

The invention consists in certain combinations of parts, hereinafter pointed out in the claims.

Figure 1:
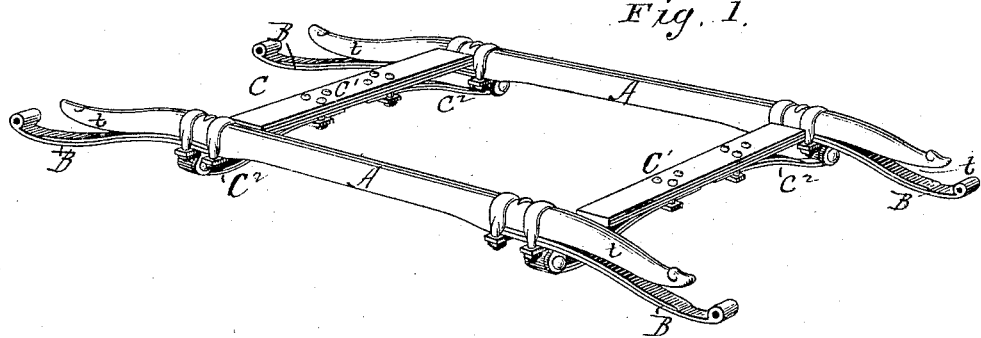
Figure 2:
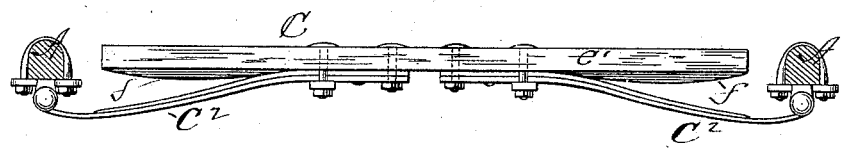
Figure 3:
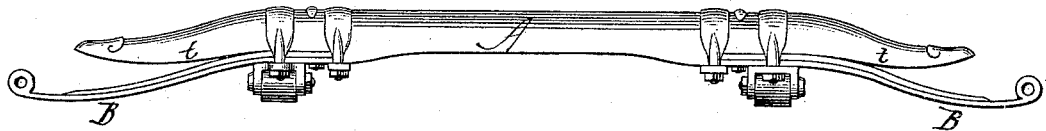

Figure 1 is a perspective view of this improved vehicle-spring. Fig. 2 is a cross-section, and Fig. 3 is a side view, thereof.

The spring side bars, A A, are made somewhat shorter than those in ordinary use, and are connected to the hind axle and bolster by means of longitudinal end springs, B. The vehicle-body is supported on cross-springs C C, which are clipped to the side bars and supported thereby. The cross-springs are preferably composed of a flat wooden bar or follower, C', and downwardly-inclined steel springs C², the inner ends of which are attached to the follower, near its center, said follower being provided with two curved lugs, *f*, on its under side, between its center and its ends, which lugs come in contact with said steel springs C² and give support to the latter as the weight is increased. The spring side bars, A, are also preferably provided on their under sides, near their outer ends, with two curved lugs, *t*, which are located over the longitudinal end springs, B, and adapted to give strength and stiffness to the latter as the pressure increases upon the springs.

A vehicle provided with this combination, spring has an easy motion, both with light and heavy loads, and maintains to a remarkable degree a steady carriage.

What is claimed as the invention is—

1. The combination of cross-springs adapted to receive the vehicle-body, spring side bars supporting said cross-springs, and longitudinal steel springs at the ends of the side bars, adapted to connect the latter with the hind axle and bolster, substantially as set forth.

2. The combination of cross-springs adapted to receive the vehicle-body, spring side bars having curved lugs on their under side, near their ends, and downwardly-inclined longitudinal steel springs connecting said side bars with the hind axle and bolster, said longitudinal steel springs passing under the curved lugs, which latter strengthen and stiffen the springs as the weight is increased, substantially as set forth.

3. The combination of cross-springs adapted to receive the vehicle-body, composed of a follower having curved lugs, and steel springs which pass under said lugs, spring side bars supporting said cross-springs, and longitudinal steel springs at the ends of the side bars, adapted to connect the latter to the hind axle and bolster, substantially as set forth.

4. The combination of cross-springs adapted to receive the vehicle-body, composed of steel springs, and a follower provided with curved lugs, which bear upon said spring side bars, provided with curved lugs on their under sides, near their ends, and downwardly-inclined longitudinal steel springs connecting said side bars with the hind axle and bolster, said longitudinal steel springs passing under the curved lugs, which latter bear upon and stiffen the springs as the weight is increased, substantially as described.

In testimony whereof I affix my signature in presence of two witnesses.

SELDEN A. BAILEY.

Witnesses:
 WILLIAM H. MITCHELL,
 H. S. MITCHELL.